United States Patent [19]

Hahn

[11] 3,899,638

[45] Aug. 12, 1975

[54] PORTABLE TONE DATA TRANSMITTER

[75] Inventor: James H. Hahn, St. Louis, Mo.

[73] Assignee: Interface Technology, Inc., St. Louis, Mo.

[22] Filed: Oct. 29, 1973

[21] Appl. No.: 410,546

[52] U.S. Cl. .............................. 179/2 DP; 179/90 K

[51] Int. Cl. ........................ H04m 11/06; H04m 1/50

[58] Field of Search ............ 179/90 K, 90 BB, 2 DP, 179/84 VF; 331/185

[56] References Cited

UNITED STATES PATENTS

| | | | |
|---|---|---|---|
| 2,951,911 | 9/1960 | Van Lottum | 179/90 K |
| 3,064,084 | 11/1962 | Meacham | 179/90 K |
| 3,184,554 | 5/1965 | Meacham | 179/90 K |
| 3,424,870 | 1/1969 | Breeden | 179/90 K |
| 3,617,646 | 11/1971 | Knollman | 179/90 K |
| 3,676,602 | 7/1972 | Goetchius | 179/84 VF |
| 3,784,759 | 1/1974 | Haight | 179/84 VF |

*Primary Examiner*—Kathleen H. Claffy
*Assistant Examiner*—Thomas D'Amico
*Attorney, Agent, or Firm*—Paul M. Denk

[57] ABSTRACT

In a portable data transmitter which incorporates a pair of tuned circuits, which induce through a transformer a frequency of oscillation in an oscillating circuit, the invention also including the location of switching transistor(s) or other semi-conductors which cooperate when turned on to allow the application of power to the various circuitry upon depression of at least one of the tone selection keys of the data transmitter. A second feature of the invention includes the introduction of electrical components into select tuned circuits to prevent frequency pulling or distortion between the pair of cooperating resonant circuits. In addition, the invention contemplates the location of electrical components within a circuit carrying a constant alternating current at the frequency of the generated tone, for example, the collector circuit of an oscillating transistor in the oscillating circuit, and wherein current may flow for operating other transmission components such as a speaker, a remote jack, or any other form of transmitting device.

11 Claims, 4 Drawing Figures

PATENTED AUG 1 2 1975 3,899,638

PORTABLE TONE DATA TRANSMITTER

BACKGROUND OF THE INVENTION

This invention relates to data transmission, and more specifically, relates to the location of discrete electronic or electrical components within the circuitry of dual oscillating tuned circuits so as to enhance its starting and precise operation for transmitting a sound or signal representative of particular data.

Various types of transmitting devices are available in the prior art, as for example, the telephone companies have devised dual-tone generating multi frequency circuits for use within a telephone so that a call may be made through the generation of a tone, usually induced from a dual oscillating circuit. This is commonly referred to as the Touch Tone type of phone. These prior art circuits are effective for their intended purpose, primarily for generating a tone to be used in telephone dialing, or perhaps for transmitting some data over the telephone lines.

The present invention improves upon the aforesaid type of prior art transmitting devices primarily in that it includes its own power source which is incorporated into and energizes the various tuned and oscillating circuits upon the actuation of an entry means, such as any one of the keys of the keyboard of this invention. To the contrary, the prior art type of data or information transmitter usually incorporates a power source which must be initially switched into this circuit from a switch means separate from the data entry means.

It is, therefore, the principal object of this invention to provide a data transmitting device which includes its own power source that is initiated into action to charge the included circuits simply upon the actuation of the keyboard or other data entry means utilized with this invention.

It is another object of this invention to provide a data transmitting apparatus wherein various forms of transmission or sending devices such as a speaker, a jack, or any other form of output operates from the output of the oscillating circuitry without affecting the inherent operation of said circuit.

A further object of this invention is to provide means for regulating and maintaining the desired tuned frequency of oscillation within each tuned circuit of a dual oscillating circuitry type of data transmitting device, when a specific type of entry means which normally causes frequency error is used.

These and other objects will become more apparent to those skilled in the art upon reviewing the following summary, and upon reviewing the description of the preferred embodiment in view of its drawings.

SUMMARY OF THE INVENTION

This invention, as previously stated, comprises a data transmitting type of device that operates upon the generation of resonant frequencies in a pair of tuned circuits, and which frequencies are summed in an oscillating circuit incorporating a transistor whose established collector current, when a frequency is established in the oscillating circuit, may operate any form of transmitting device such as speaker, an internal speaker of the device, or operate through a remote jack, or the like, for transmitting data. A device of this type may be employed for sending data, either in the form of an electrical signal, a tone, or the like, to a remote source, such as over the telephone, where the data may be deciphered and used. For example, a salesman may desire to transmit an order to the home office, and through the use of this invention may transmit information regarding the sale, and which information may be sent over the telephone in the form of digital or binary coded information to be received by the computer at the office to commence processing and fulfilling of said order. The device is substantially portable in use due to the fact that it incorporates its own power source, primarily a battery, and upon depression or operation of any of the input devices to the apparatus, such as a keyboard, individual input switches, or the like, one or more of switching transistors are immediately turned on through the charging of their bases from the voltage source, and which allows the pair of tuned circuits and a responsive oscillating circuit to instantaneously be charged and function. In a preferred embodiment, the entry means comprises a compact keyboard incorporating the digits 0–9 and other special keys as may be desirable and useful in transmitting actual or representative data. When a particular key is depressed, it completes circuitry in each of the dual tuned or frequency selection circuits which are capable of oscillating at a variety of particular frequencies depending upon the key selected, and at the same time providing charge to the switching transistors which turn on the device. This latter feature is one of the elements of novelty in this invention, wherein the data transmitting device incorporates its own power source, usually a nine volt battery, and the circuitry, in particular that portion incorporating the switching transistors, are instantaneously energized upon depression of one of the entry means, so that power is immediately transmitted to the circuitry to provide for the desired dual oscillations at select resonant frequencies that are effective for inducing the alternating current required of this device.

Another feature of this invention is that the collector of the oscillating transistor will be charged and maintain the same alternating current generated in the primary oscillating circuit, and this generated alternating current which is maintained somewhat independently of the operations of the oscillating circuit itself, can be used for rendering operative other transmitting devices such as a speaker, or other type of means for transmission of data representative signals. For example, the internal speaker of the invention may be connected to the mouthpiece of a telephone and transmit a signal in the form of a tone to a distant location.

A third element of this invention, and one that has been found helpful for maintaining the precision of operation in multi oscillating circuitry is the use of various electrical components that maintain the frequency of oscillations substantially constant and at the level of resonant frequency designed for the circuit. For example, in a dual oscillating circuit, where it is desired to generate two tuned frequencies in somewhat independent oscillating circuits that together may induce a third or primary oscillating circuit that may be used for furnishing an alternating current for operating a transmitting device, as previously described, on occasion the frequencies of the two separate tuned circuits, particularly where the frequencies of the two circuits are somewhat close, have the tendency to affect each other such as through a shifting or pulling effect, changing each others frequency, thereby distorting the primary frequency generated in the primary oscillating circuit.

Hence, the generated primary frequency in the primary oscillating circuit may be somewhat distorted, thereby causing the transmitting means to be operated or to transmit a signal that may furnish an incorrect data bit at a remote location, where the transmitted signal is eventually picked up. To alleviate this, it has been found that the addition of various electrical components, such as a capacitance or inductance located either, respectively, in parallel or in series with the secondary windings of one or more of the dual tuned circuits has a tendency to stablize the generated frequency, and to prevent these undesirable detrimental distortions.

BRIEF DESCRIPTION OF THE DRAWINGS

In the drawings,

FIG. 4 discloses an alternate means for using the generated collector current for use in operating a transmitting means such as a speaker, or the like.

DESCRIPTION OF THE PREFERRED EMBODIMENT

Figure 1:
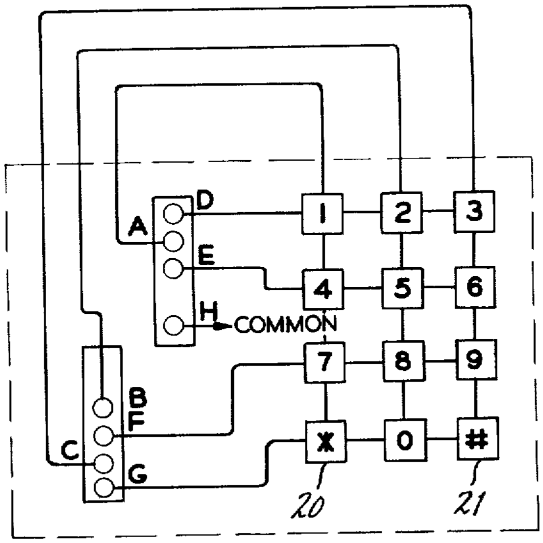
FIG. 1 provides a schematic view of one entry means, in this particular instance, comprising a keyboard that can be used in conjunction with the circuitry of this invention.

In referring to FIG. 1, there is shown a schematic of the type of entry means that may be used in this invention, and is displayed as a keyboard type of entry means wherein a series of keys which may be representative of the digits 0 through 9 may be displayed upon the exterior of the data terminal or transmitter, and available for ready acutation by the user. In addition, the keyboard of this entry means may include any variety of additional keys, such as shown at 20 and 21, to be used in any manner as designed, as for example, to be used as spacers between data, or for any other purpose. Keyboard switch arrays of this type are available from Chomerics, of Woburn, Massachusetts. Since this invention in the preferred embodiment contemplates principally first its use in conjunction with a dual tuned circuit that is established upon the depression of each key of the entry means, at least two circuits are completed to provide the necessary resonant frequencies that are then summed in a primary circuit as will be hereinafter described. For example, the depression of key number 1, the circuit line A will be connected with the H common circuit line, and at the same time the circuit line D will be connected also with the H common line so as to provide two closed circuits for generating separate resonant frequencies in their respective circuits. Hence, the depression of any particular key upon the keyboard electrically connects both of the lines associated with that particular key to the H common line.

Figure 2:
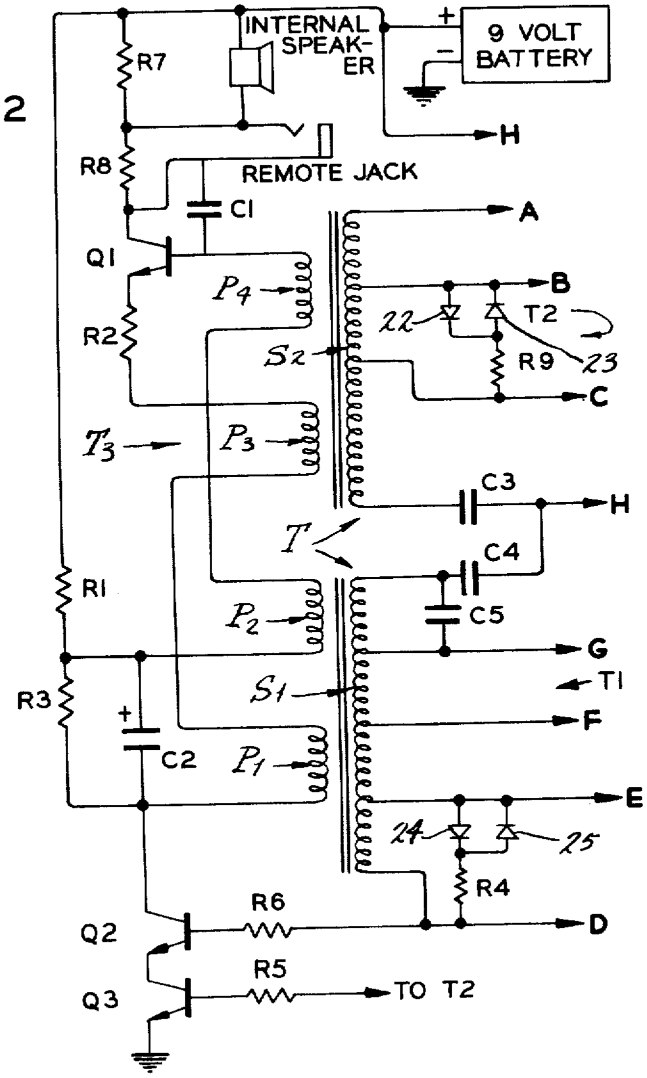
FIG. 2 is a circuit diagram of the dual tuned circuits and the primary oscillating circuitry used in this invention.

By referring to FIG. 2, the circuit diagram for the preferred embodiment of this invention is disclosed, which in this particular instance, is designed for functioning as a dual oscillating or a resonant frequency generating circuitry, but also incorporates a starting or power control circuitry for use in instantly applying power to the circuitry as a particular entry means is depressed. The first resonant frequency generating circuit of this invention is identified at T1, while the second tuned circuit is shown at T2. Since both of these circuits include secondary windings S1 and S2 of the transformers T, the primary windings P1, P2, P3, and P4 are responsive to the generation of the electrical oscillations in the circuits T1 and T2, and comprise the means for creating an additional or additive frequency within what will be identified as the primary oscillating circuit T3. Power is supplied to the circuit T3 when the switching transistors Q2 and Q3 are turned on. But oscillations are not created in the circuit T3 until circuits T1 and T2 are operating. At that time, an additive frequency develops in the circuit T3, and an alternating current is induced within this circuitry T3 which current also flows through the oscillating transistor Q1. This stimulates an identical alternating current in the collector circuit of this transistor, which creates a particular voltage through the resistors 7 or 8, and which are useful for actuating any form of signal transmitting device, such as the internal speaker of this data transmitter, or perhaps the operating voltage jack for transmitting a particular charge to a remote source, such as over the telephone, as previously stated.

The supply of initial power to this data terminal includes a starting or power control circuit, which incorporates a pair of switches, namely the transistors Q2 and Q3, wherein their bases are connected by circuit lines to the secondary windings of the oscillating circuits T1 and T2, while these transistors are connected in series to the 9 volt battery through ground. Hence, upon the depression of any particular key upon the keyboard of the entry means, as previously described, the H common circuit line connects with a particular tap on the secondary windings of each of the tuned circuits T1 and T2, in addition to positively charging the bases of the switching transistors, thereby charging the circuitry of this data transmitter for operation. The resistors R5 and R6 provided in the base circuit lines of the switching transistors are simply current limiters so as to provide established levels of the positive charge acting upon these transistor bases.

The first key 1, as previously described, includes a series of contact points identified at A and D, which correlate with the contact points shown in the schematic of FIG. 1. Each of these contact points are provided with circuit lines that lead to the like numbered taps on the secondary winding of the transformer T, at particular locations, and since pressure on a keyboard also connects the H common line into the circuit diagram, a particular tuned frequency of oscillation is generated in the circuit T1 upon depressing a key. In a model of this invention, upon the depression of key 1, the entire secondary winding S1, in cooperation with the capacitor C4, induces the generation of oscillations having a tuned frequency in the vicinity of 697 Hz. At the same time, the circuit line A is tapped to the winding S2, and along with the capacitor C3, induces a frequency in the vicinity of 1209 Hz. These two tuned frequencies establish conditions for oscillation in the oscillator circuit T3, which also is turned on through the switch means Q2 and Q3, which effectively connects the negative side of the oscillator circuit T3 to the negative side of the battery. When this occurs, the circuit then begins to oscillate at the frequencies selected by the tuned circuits. A side benefit of this arrangement is that no oscillations occur until both tuned circuits are complete, eliminating the possibility of generating incorrect frequencies if the two switch contacts do not close simultaneously.

Just as previously described, upon the depression of any one of the keys 0 through 9, and perhaps some of the supplemental keys 20 and 21, a particular oscillating frequency is also generated within the tuned circuits T1 and T2, so that, for example, when key 2 is depressed, circuit lines D and B are set to be charged, and to commence oscillation, generating a frequency in circuit T1 in the vicinity of 697 Hz., while simultaneously generating a frequency in circuit T2 of approximately 1336 Hz. Likewise, upon the actuation of key number 3 of the entry means, the circuit lines C within the circuitry T2 is connected, and generates the frequency of oscillation therein. In the working model of this invention, the frequency generated therein is approximately 1477 Hz. The circuit line D is also charged to sustain the aforesaid frequency of 697 Hz.

In the preferred embodiment, the capacitance of capacitors C3 and C4 are selected at 0.043 microfarads, but obviously capacitance of other quantity may be used depending upon the level of frequency desired in the tuned circuits.

And, to further describe the invention, by way of illustration, in reviewing the operating parameters of the working model, circuit line E when included in the circuit T1 creates a tuned frequency at 770 Hz. Also circuit lines F and G may give rise to frequencies in the vicinity of 852 Hz. and 941 Hz, respectively. Each of these frequencies, when induced in the tuned circuit T1, are capable of cooperating with one of the resonant frequencies of the circuit T2 to create conditions for oscillation in the oscillating circuit T3 at select levels.

Also disclosed in the oscillating circuits T1 and T2 are a series of parallel connected diodes 22, 23, 24 and 25, with the first two diodes being arranged in series with the resistor R9, and the second two diodes being arranged in series with the resistance R4. These diodes and resistances are so located for controlling and establishing the voltage levels with the resistance acting as a means for limiting current.

As previously described in the summary of this invention, in certain instances, where dual frequencies are generated within the two tuned circuits, and when these circuits are interconnected as shown in the disclosed circuit diagram of FIG. 2, there is a tendency for the frequencies generated within these circuits, particularly where the frequencies are somewhat close to each other, to be shifted or pulled by the other, thereby disrupting or causing distortion in the desired levels of generated frequencies. This problem has been encountered in the circuit diagram of the present invention particularly when the 941 Hz is generated in the circuit T1 when circuit line G is connected into said circuit. Also, when circuit line A is connected into the tuned circuit T2 there is developed a frequency of approximately 1209 Hz. There is a tendency when these two proximate developed frequencies are generated to have a pulling or shifting of these two oscillations to each other, particularly with the high frequency pulling up or distorting the lower frequency of T1. To rectify this problem, a capacitor C5 which may be of a value of 0.0033 microfarads, is located between the circuit line G and the line H common, and has a tendency to stabilize and maintain the developed frequency within the oscillating circuit T1 preventing its rise or shift towards the higher level of cooperating frequency, the 1209 Hz generated within the tuned circuit T2. This shift or pull of a generated frequency in one circuit towards a higher frequency in a second circuit is detrimental since these generated potentials as transmitted through the primary windings P1 through P4 of the transformer T develop an additive frequency within the oscillating circuitry T3 which may be different from the frequency desired. And, as previously described, if the frequency generated in the circuitry T3 is greater or different from that designed for, then the frequency of the signal or charge to the oscillating transistor Q1 will be greater than desired, resulting in the existence of an incorrect frequency alternating current in the resistors R7 and R8 of the collector circuit. When such a condition prevails, the frequency maintained therein will be different than desired, creating an improper tone through the internal speaker as shown, resulting in the transmission of an inaccurate signal that may cause the selection of a wrong digit at a remote location.

The series of resistors R1, R2, R3, and capacitance C2 provided in the oscillating circuitry T3 are provided for biasing purposes, and for determining the operating voltage and current levels within the primary oscillating circuit T3. For example, in a working model, resistance R1 has been designed at 3.9 Kohms, resistor R2 has been set at 22 ohms, resistance R3 is 750 ohms, and capacitor C2, which is also connected to the collector of one of the switching transistors Q2 is 1.0 microfarad. In addition, and to prevent or suppress any undesirable or parasitic type of oscillations within the primary oscillating circuitry T3, a capacitor C1, is used in the working model and has a value of 0.005 microfarads.

Figure 3:
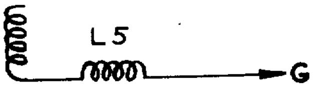
FIG. 3 discloses an alternate means for stablizing the frequency generated in one of the tuned circuits.

As disclosed in FIG. 3, a slight modification may be provided for preventing a pull or drift on the frequency generated within the oscillating circuitry T1 when the circuit line G is operative, and this may be achieved by replacing the capacitor C5 with a series inductance L5, as shown.

Figure 4:
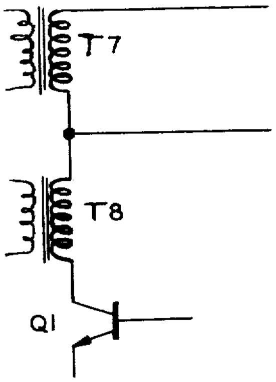

As disclosed in FIG. 4, it is just as likely that the alternating current maintained in the collector circuit of the transistor Q1 may energize other forms of electrical components, such as the transformer T7 and T8, which may be used in place of the resistance R7 and R8, as a means for generating some form of a signal for transmission purposes.

The relationship of the various components as shown in the circuit diagram of FIG. 2, in addition to the modifications as shown in FIGS. 3 and 4, are described herein for purposes of illustration, and it is just as likely that other variations in the type of components utilized in the circuitry of this invention may be used in place of those shown, and still provide the desired results of this invention, which as previously described, is to provide a method of applying power to preferably a pair of tuned circuits and at the same time induce oscillation in an associated oscillating circuitry to provide a means for creating an alternating current within the independent collector circuit of its oscillating transistor which may be used for transmitting a signal to a remote location without having any effect on the frequency induced within the primary oscillating circuitry or its oscillating transistor. It is likely that numerous variations in the construction of the oscillating circuitry of this invention, within the scope of the appended claims, will occur to those skilled in the art in view of the foregoing disclosure. The described embodiment is merely illustrative.

Having thus described the invention what is claimed and desired to be secured by letters patent is:

1. In a portable data transmitter for use in sending a signal representative of data over a transmission means such as a telephone, said transmitter incorporating at least a pair of tuned circuits which upon oscillation generate a summed oscillation in a third oscillating circuit which establishes an alternating current for energization of the transmitter for sending of the signal over the transmission means, entry means and a power source in the portable transmitter, the actuation of said entry means energizing said circuits from the power source for establishment of the frequency of oscillations in said tuned circuits, a starter circuit electrically coupled to said third oscillating circuit and being connected to the power source for energization of said third oscillating circuit and inducement of the summed oscillations therein upon an actuation of the entry means, said starter circuit including a switch means which is energized for operation by means of the tuned circuits immediately upon activation of the entry means for effecting energization of said oscillating circuit from the power source and for establishing its summed oscillating frequency therein for inducement of the alternating current that establishes the signal representative of data for transfer over the transmission means.

2. The invention of claim 1 wherein said switch means comprises at least one transistor which is turned on through actuation of the entry means that supplies energy from the power source to the tuned circuits that in turn energizes the base of said transistor.

3. In a portable data transmitter for use in sending a signal representative of the data over a transmission means such as a telephone, said transmitter incorporating at least a pair of tuned circuits which upon oscillation generate a summed oscillation in a third oscillating circuit which establishes an alternating current for energization of the transmitter for sending of the signal over the transmission means, entry means and a power source in the portable transmitter, the actuation of said entry means energizing said circuits from the power source for establishment of the frequency of oscillations in said tuned circuits, a starter circuit electrically coupled to said third oscillating circuit and being connected to the power source for energization of said third oscillating circuit and inducement of the summed oscillations therein upon an actuation of the entry means, said starter circuit including switch means which is energized for operation by means of the tuned circuits immediately upon activation of the entry means for effecting energization of said third oscillating circuit from the power source and for establishing its summed oscillating frequency therein for inducement of the alternating current that establishes the signal representative of data for transfer over the transmission means, said switch means comprising a transistor for each of the tuned circuits, the base of each transistor being electrically connected to the circuitry of its respective tuned circuit, and when turned on through the actuation of the entry means supplies energy from the power source to the oscillating circuit.

4. The invention of claim 2 wherein said power source comprises a low voltage battery packaged within the data transmitter, the base of said switch means transistor being electrically connected to said pair of tuned circuits and capable of being energized thereby upon their oscillation, the emitter of said switch means transistor being electrically connected to said battery and capable of energizing the third oscillating circuit upon actuation of the entry means.

5. The invention of claim 2 wherein said power source comprises a low voltage battery packaged within the data transmitter, the said switch means comprises a pair of transistors the bases of which are connected respectively to the pair of tuned circuits and capable of being turned on upon energization of said tuned circuits upon actuation of the entry means, said pair of transistors being connected in series with the emitter of one transistor being connected to the collector of the other and together being connected to said battery for effecting simultaneous charging of the oscillating circuit upon actuation of the entry means and oscillating of the tuned circuits.

6. The invention of claim 1 wherein said oscillating circuit and the pair of tuned circuits are electrically connected through a transformer, the oscillations in the third oscillating circuit being generated through the primary of said transformer and having its frequency of oscillation determined by the frequency of oscillations of the said pair of tuned circuits through the transformer secondary, an oscillator transistor connected in said third oscillating circuit and having its base to emitter connected in said circuit, and the transmission means being electrically connected to the transistor collector circuit and being responsive to the current established therein.

7. The invention of claim 1 wherein said portable data transmitter includes a pair of tuned circuits, each of said tuned circuits capable of oscillating at a predetermined frequency dependent upon the selection of the entry means, said tuned circuits including a transformer, said pair of tuned circuits being electrically connected to the secondary of said transformer, and said third oscillating circuit connected to the primary of said transformer and having its frequency of oscillation determined by the frequency of the pair of tuned circuits, and the transmission means being electrically responsive to the third oscillating circuitry for transmission of a generated signal representative of data.

8. The invention of claim 7 wherein said switch means comprises at least one transistor, the base of the transistor being electrically connected to the tuned circuits and capable of being energized thereby upon actuation of the entry means.

9. The invention of claim 7 including means to prevent distortion of the frequency generated in one of said tuned circuits, said means including a capacitor connected in parallel with the inductance of one of said tuned circuits.

10. The invention of claim 7 including means for preventing distortion of the frequency generated in one of said tuned circuits, said means including an inductor connected in series with the inductance of said tuned circuit.

11. The invention of claim 8 wherein said switch means includes a pair of transistors, the bases of both said transistors being electrically connected respectively to the pair of tuned circuits and capable of being energized thereby upon actuation of the entry means.

* * * * *